United States Patent [19]

Elliott, Sr. et al.

[11] Patent Number: 5,058,945
[45] Date of Patent: Oct. 22, 1991

[54] LONG-HAUL VEHICLE STREAMLINE APPARATUS

[76] Inventors: Morris C. Elliott, Sr., 11723 Norino Dr., Whittier, Calif. 90601; Mark W. Elliott, 521 Vittorio, Coral Gables, Fla. 33146

[21] Appl. No.: 535,090

[22] Filed: Jun. 8, 1990

[51] Int. Cl.⁵ .............................................. B62D 35/00
[52] U.S. Cl. ............................... 296/180.5; 296/180.1; 296/180.4
[58] Field of Search ............... 276/180.1, 180.4, 180.5; 105/1.1, 18, 20

[56] References Cited

U.S. PATENT DOCUMENTS

| | | | |
|---|---|---|---|
| 3,834,410 | 8/1974 | Leibel . | |
| 3,834,752 | 9/1974 | Cook et al. | 105/1.1 X |
| 3,945,677 | 3/1976 | Servais et al. | 105/1.1 X |
| 4,006,932 | 2/1977 | McDonald | 296/180.4 |
| 4,030,779 | 6/1977 | Johnson | 296/180.4 |
| 4,236,745 | 12/1980 | Davis | 296/180.4 |
| 4,343,505 | 8/1982 | Levassor | 296/180.4 X |
| 4,455,045 | 6/1984 | Wheeler | 244/200 X |
| 4,601,508 | 7/1986 | Kerian | 296/180.4 |
| 4,682,808 | 7/1987 | Bilanin | 296/91 X |
| 4,702,509 | 10/1987 | Elliott, Sr. | 296/180.4 |
| 4,741,569 | 5/1988 | Sutphen | 296/180.4 |

FOREIGN PATENT DOCUMENTS

| | | | |
|---|---|---|---|
| 0352112 | 1/1990 | European Pat. Off. | 296/180.5 |
| 2911084 | 9/1980 | Fed. Rep. of Germany | 296/180.4 |

OTHER PUBLICATIONS

"Wheeler VGs" brochure; Vortex Products, Sumner, WA; 21 pages; no date.
"The Truck of the Future" by J. Zygmont; 8 pages; Popular Mechanics, Jun. 1985.
"'Big-Rig' Truck Device Could Lead to Billions in Fuel Savings" by D. James; 2 pages; Astrogram V. XXXI, No. 10, 01-27-89.
"A Study of Aerodynamic Method for Improving Truck Fuel Economy" by F. Buckley Jr. et al.; cover, pp. v-vi, xiv-xvvi, 117-122, 140-143, 146, 158, 185-186; 191, 38; Apr., 1978.
Fruehauf FEU2000 From Continuum Dynamics, Inc., Jan. 19, 1990.

Primary Examiner—Dennis H. Pedder
Attorney, Agent, or Firm—Sheldon & Mak

[57] ABSTRACT

An vehicle streamliner has a balloon or bag member that is supported by a belt member that is tensioned about a generally cylindrical longitudinal perimeter surface of the vehicle. The bag member can be configured for support against an end face area of the vehicle, and preferred shapes for the bag member are disclosed. An array of vortex generators are provided proximate a forward extremity of the belt member for promoting attached flow ahead of and over the bag member. A pair of the belt members can connect the bag member between tandem articulated vehicle elements for smoothly covering a gap between the elements, the bag member being formed of a thin, stretchable material that assumes a pleated condition when relaxed, the pleats disappearing when the vehicle elements are proximately aligned.

21 Claims, 4 Drawing Sheets

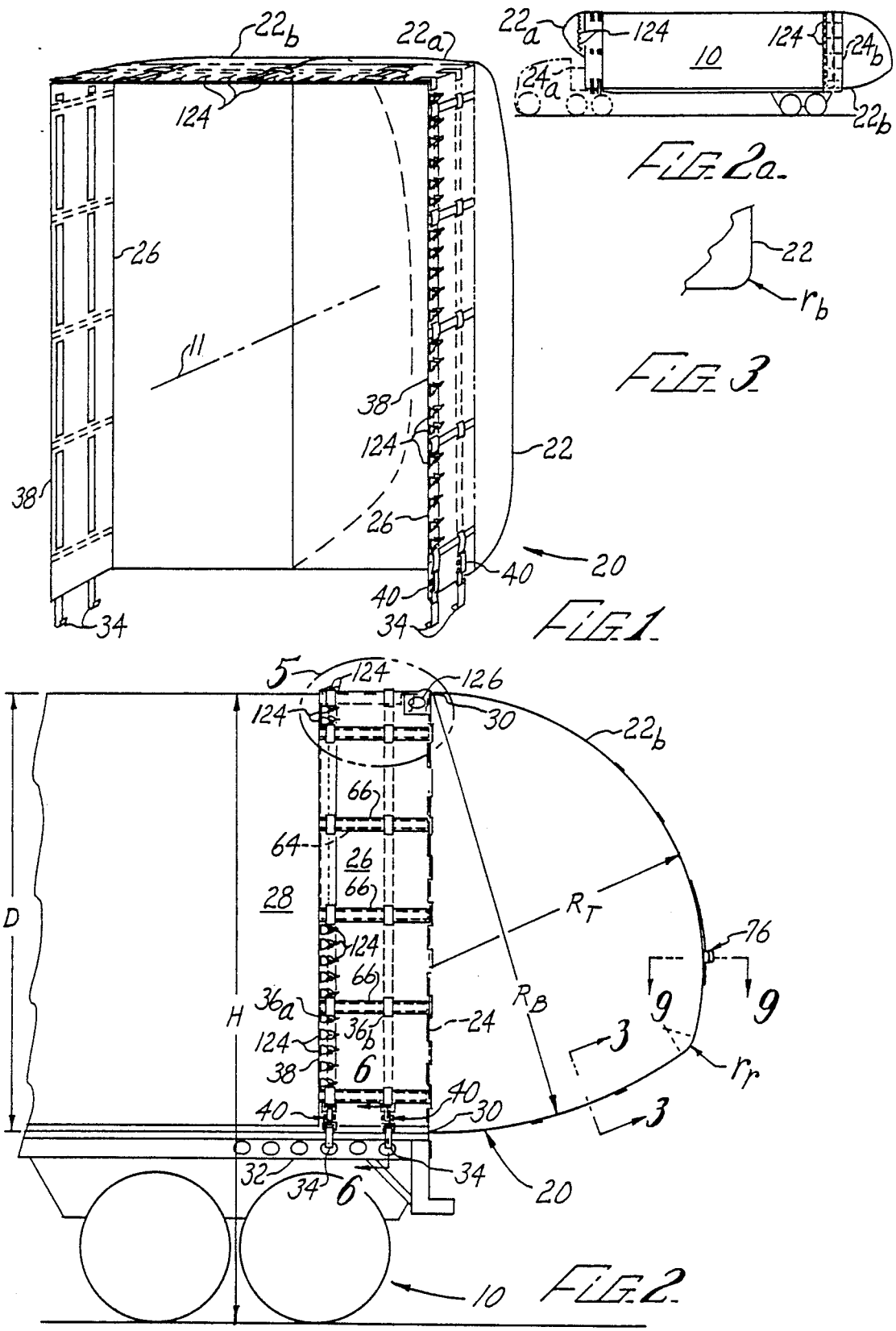

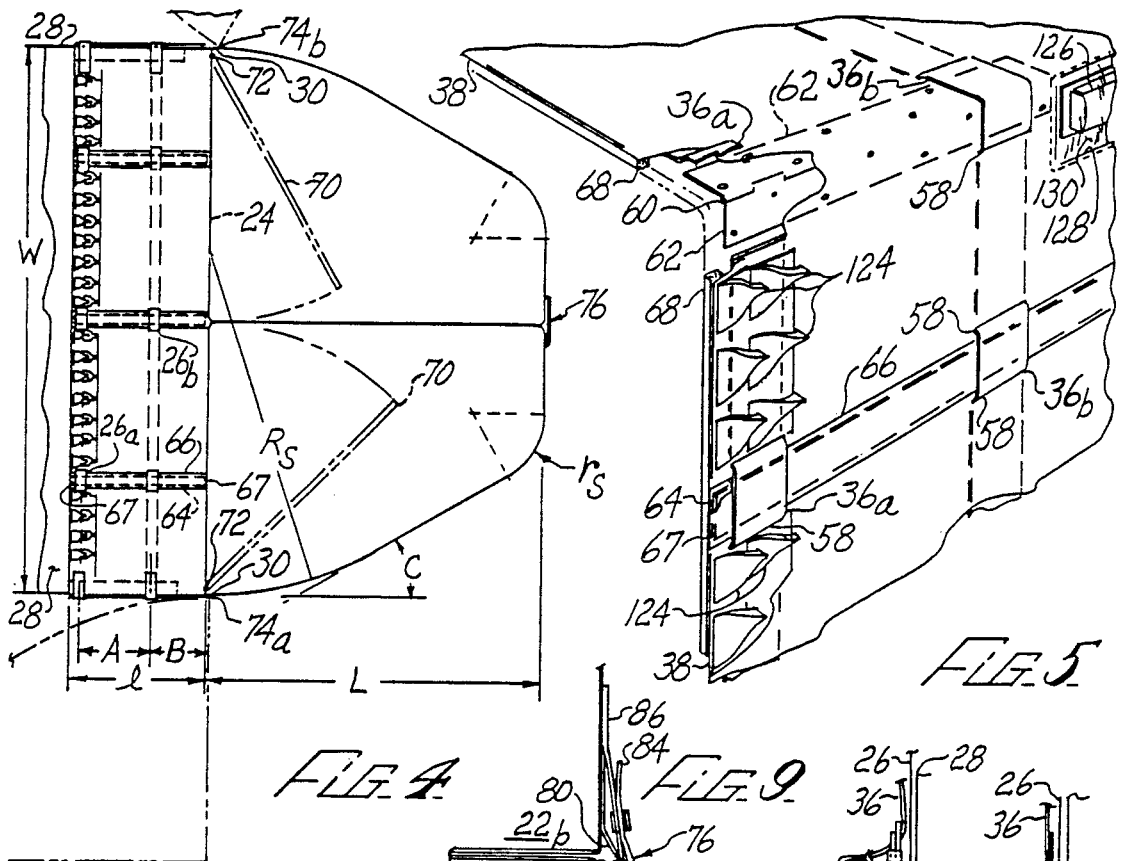
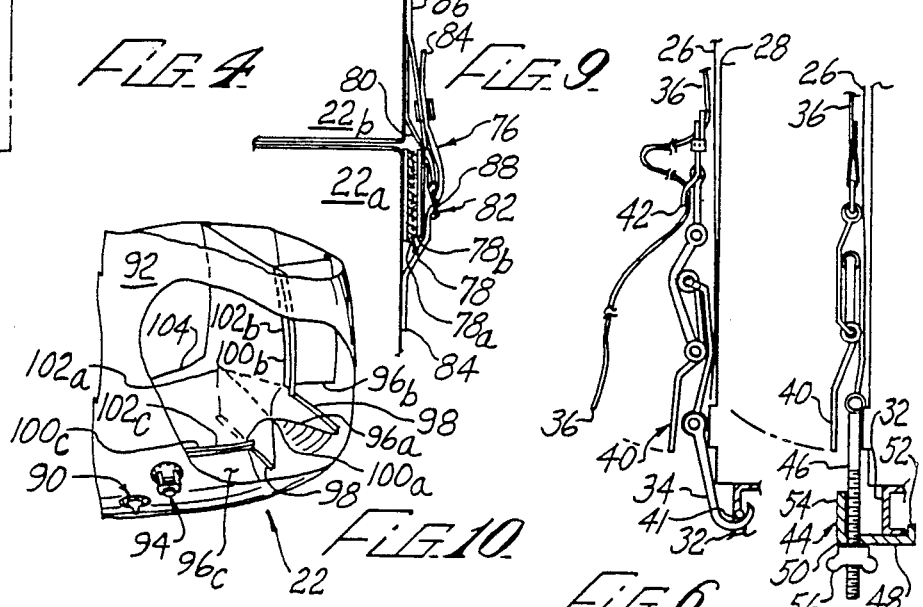
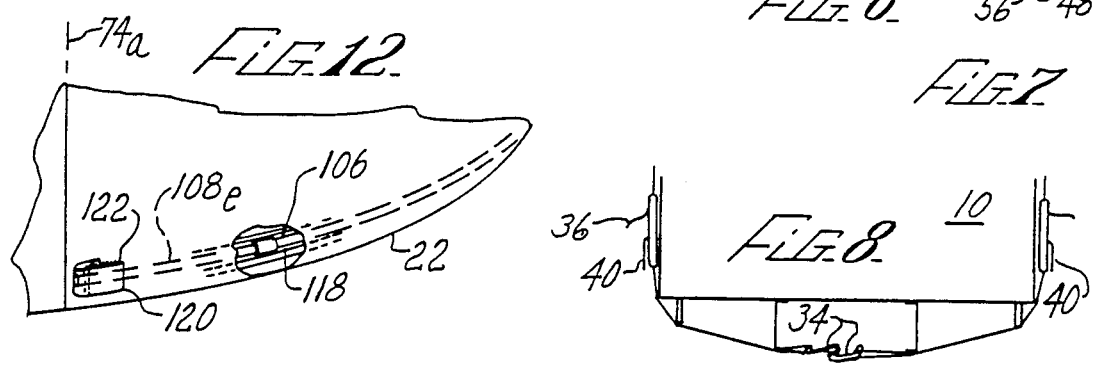

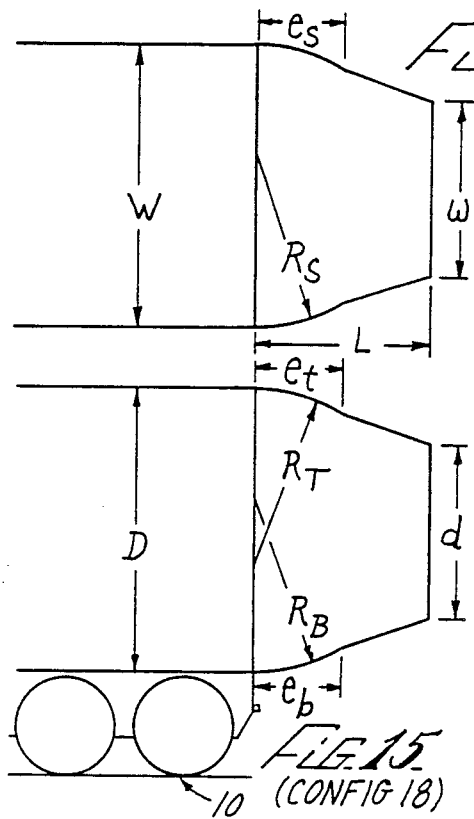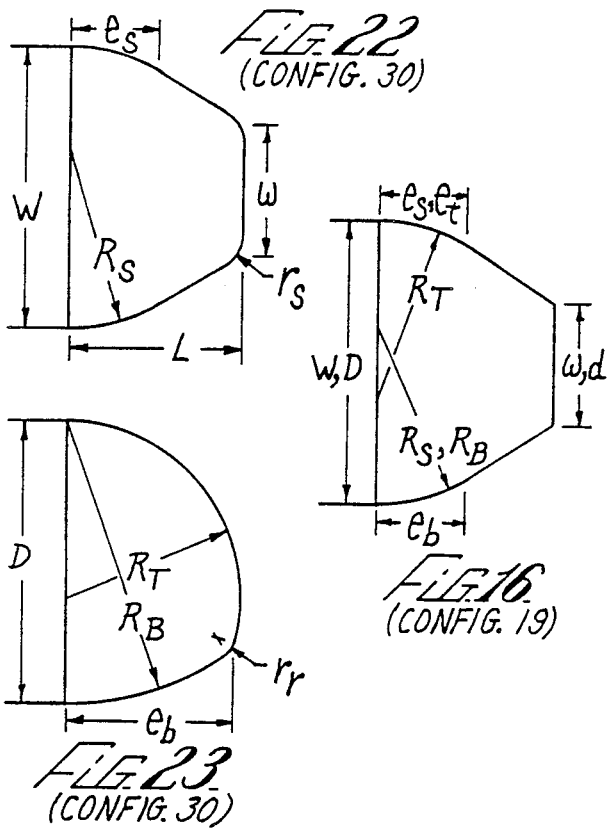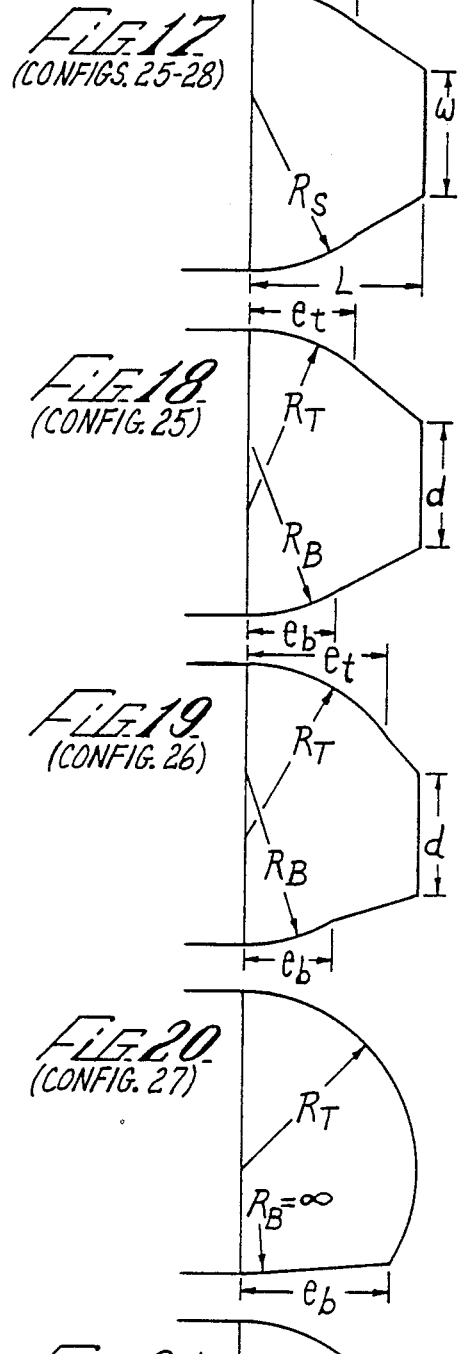

LONG-HAUL VEHICLE STREAMLINE APPARATUS

BACKGROUND

The present invention relates to vehicle drag reduction for improved fuel economy, and more particularly to streamlining of long-haul freight vehicles such as truck-tractor trailer rigs.

The boxy shape of conventional tractor-trailer combinations is dictated by a need to provide a large cargo volume within the maximum allowable dimensions that are fixed by state laws. In the past, the low aerodynamic efficiency of these vehicles was considered of little importance. However, the high cost and uncertain availability of fossil fuels has increasingly focused attention on reducing the aerodynamic drag that accounts for approximately half of the fuel consumption of large trucks in long-haul highway operations.

The potential economic benefit of drag-reduction apparatus can be evaluated based on the fuel that would be saved using the apparatus, the saving being independent of vehicle weight and rolling resistance. For example, a conventional tractor-trailer combination weighing from about 60,000 to about 80,000 pounds and having a cross-sectional area of 100 square feet and a drag coefficient of 1.0 typically consumes about 20 gallons of diesel fuel per hundred miles at 55 MPH, the fuel costing $22 at a price of $1.10 per gallon. The truck requires about 165 horsepower to overcome about 350 pounds of rolling drag and about 775 pounds of aerodynamic drag. A ten percent reduction in the aerodynamic drag results in a savings of $$\frac{77.5}{550} \times 55 \times \frac{88}{60} = 11.4 \text{ HP.}$$

This is equivalent to a savings of about 1.33 gallons or $1.46 per hundred miles, independent of vehicle loading. On a trip of 2,000 miles, the savings is more than $29.

At higher speeds, air drag is greater and there is corresponding greater reduction in drag for even greater savings. For example, on a 2,000 mile trip at 65 MPH, the aerodynamic drag increases 40% and a ten percent reduction results in a savings of about $41 in fuel costs. The potential savings are $82.50 per 2,000 miles at 65 MPH with a 20% reduction in drag. Further, when the effects of wind are considered, the potential savings are even greater. Moreover, the costs and availability of diesel fuel are subject to change, potentially making aerodynamic drag a critical factor in shipping economy.

Although there are a variety of devices in the prior art for improving the aerodynamics of truck vehicles, these devices exhibit at least some of the following disadvantages:

1. they are ineffective in that they provide little or no drag reduction in actual use;
2. they are awkward to use in that they interfere with normal loading and maintenance operations;
3. they are heavy and bulky, being difficult to install, remove, and store when not in use;
4. they are unsafe in that they interfere with lighting visibility;
5. when permanently installed on a tractor, they increase the drag of dead-heading without a trailer; and
6. they are costly to produce and install.

Thus there is a need for streamlining apparatus for trucks that is effective for significantly reducing fuel consumption, is safe and easy to use and inexpensive to produce and install.

SUMMARY

The present invention is directed to long-haul streamline apparatus that meets this need by providing an aerodynamic balloon for shaping a body end member of a freight vehicle rig having a perimeter surface substantially perpendicular to the end member, the balloon being supported without modification of the vehicle body. The apparatus includes a substantially planar belt member; means for supporting the belt member in close conformity with the perimeter surface, including means for tensioning the belt member; bag means located against the face area and having a smooth aerodynamic convex portion facing away from the face area; and mounting means for connecting the bag means to the belt member for supporting the bag means proximate the face area.

Preferably, the means for tensioning the belt member includes first and second hook members for engaging respective ones of perimeter surface extremities that are typically located just below opposite sides of the body; means for connecting the hook members to opposite ends of the belt member; and tightening means for pulling at least one of the hook members at high mechanical advantage toward the other hook member in the plane of the belt member. Thus the belt member securely anchors the bag means, without modification of the vehicle. The tightening means can include over-center lever means connected between the hook members and can have a latched position and an unlatched position such that the belt member is tightened in the latched position.

The means for connecting the hook members can include a strap member engaging the belt member, the strap member and the over-center lever member being connected between the hook members. The strap member can slidably engage loop means on the belt member. A first strap member is preferably located proximate an edge margin of the belt member opposite the bag means, a second strap member being spaced between the first strap member and the bag means. Preferably a plurality of batten members are included for separating the strap members by stiffening the belt member, each batten member being enclosed in a batten pocket of the belt member and oriented substantially parallel to the travel axis for preventing gathering of the belt member. At least some of the batten pockets preferably engage opposite ends of the respective battens for maintaining the belt member in a longitudinally extended condition. The apparatus also preferably includes a resilient, elongate gasket member connected to an inside surface of the belt member proximate the edge margin for damping vibrations of the belt member, and for sealing the edge margin against the perimeter surface of the vehicle body.

The tightening means can include threaded clamp means connected between the hook member and the belt member for threadingly advancing the hook member relative to the belt member. The clamp means can include a threaded rod member fixably connected to the belt member and protruding the hook member, and a nut member threadingly engaging the rod member for advancing the rod member through the hook member. The hook member can include a channel member having a web portion and opposite upstanding flange portions, the rod member preferably protruding the web portion proximate one of the flange portions, wherein a flange extremity of the flange portion contacts the rod member for maintaining the web portion substantially perpendicular to the rod member. The clamp means can further include lever means having an open position wherein the hook member can be threadingly advanced in a loose condition for adjustment thereof, and a closed position, the belt member becoming tensioned when the lever means is moved from the open to the closed position.

The vehicle body can include at least one openable door member, an outside surface of the door member forming at least a portion of the face surface, the mounting means including bag hinge means for swingably supporting at least a portion of the bag means from the belt means on a bag hinge axis located proximately coplanar with a side portion of the belt member and bag holding means for releasably holding the swingable portion of the bag means proximate the face area when the door member is in its closed position. Preferably the bag holding means includes bag fastener means for connecting the swingable portion of the bag means to an adjacent bag means portion, the bag fastener means being located at a substantial distance from the plane of the face area and from the bag hinge axis. The bag fastener means can include a hook and loop fastener. Preferably, the bag fastener means further includes an auxiliary strap for connecting between the bag means portions and across the hook and loop fastener for preventing opening of the hook and loop fastener.

Preferably, the vehicle body forms a laterally disposed pair of the door members, the bag means forming a pair of openable bag halves, the bag fastener means releasably connecting the bag halves. The bag hinge means can include a flexible member connecting the bag means to the belt member along substantially the full length of the belt member side portion. The bag hinge means can include, with or without the flexible member, a pair of pivotally connected hinge members fixably connected, respectively, to the belt member and the bag means.

The vehicle body can be substantially rectangular in lateral cross-section, the perimeter surface including a top segment and opposite side segments joined thereto, the belt member having corresponding top and side segments, each side segment of the belt member being joined to the top segment thereof by an angle member, the angle member including an intersecting pair of panel members for engaging intersecting perimeter surface segments, thereby reinforcing the belt member and facilitating registration of the belt member in a centered lateral position on the vehicle body. Preferably the panel members of each angle member are foldably connected for facilitating compact storage and transport of the apparatus when not in use.

The perimeter surface can be interrupted at opposite perimeter surface extremities, the surface extremities being located proximate bottom extremities of each side surface segment, the means for supporting the belt member including a strap member engaging the belt member, and hook means connected to opposite ends of the strap member for tensioning the strap member about the belt member. Preferably lock down means is included for adjustably tightening the strap member at high mechanical advantage. The hook means preferably includes a pair of hook members for engaging the vehicle proximate the surface extremities. Also, the hook means preferably includes a pair of connectable hook members for connecting the strap member in a closed loop about the perimeter surface.

Preferably, when the face area is typically configured substantially rectangular and spaced above road height, an outside surface of the bag means is formed as a smooth rearward continuation of the perimeter surface of the vehicle and having an elevational contour that extends rearwardly and downwardly from an upper extremity of the face area in a curved upper profile. The upper profile can be arcuate, being formed as a surface of revolution about a horizontal axis proximately in the plane of the face area. The elevational contour can also extend rearwardly from proximate the bottom of the face area in a lower profile. Preferably at least a forward portion of the lower elevational profile is curved, being downwardly convex and extending rearwardly and upwardly from the plane of the face area. The lower elevational profile can be arcuate, being formed as a surface of a revolution about a horizontal axis that is preferably located proximately at the upper extremity of the face area.

Further, a plan contour of the bag surface preferably extends rearwardly and inwardly from proximate opposite side extremities of the face area in respective side plan profiles. A forward portion of each side plan profile can form a surface of revolution about corresponding locations in the plane of the face area and between approximately midway between the face area side extremities and the opposite side extremity, and forming respective side tangent segments tangent to one of the side arcuate surfaces and extending rearwardly and inwardly to a rear extremity surface portion of the bag means. A portion of each side tangent segment can lie in a vertical tangent plane at a side tangent angle relative to the longitudinal vehicle axis. Preferably, the side tangent angle is between about 20° and about 40°; more preferably, the angle is approximately 30°, the combination of the elevation and plan contours providing a particularly efficient aerodynamic shape that is easily and inexpensively fabricated.

Preferably the apparatus further includes a plurality of vortex generator members for promoting attached air flow over the bag means. Preferably, when the bag means is behind the face surface, at least some of the vortex generators are mounted to the belt means for inducing the attached flow ahead of the bag means. Also at least some of the vortex generators are preferably located proximate a leading edge of the belt means for enhancing the promotion of attached air flow forwardly of the bag means.

The bag means is preferably inflatable for facilitating the formation of a smooth, convex aerodynamic shape. Preferably, the bag means includes a air-tight flexible outer member and a flexible tension member within the outer member, at least one end of each tension member being connected to the outer member for maintaining a desired aerodynamic shape of the bag means when the outer is inflated. The bag means is preferably collapsible whether or not it is inflatable, the bag means including a flexible outer layer; a plurality of stiffener poles; a plurality of elongate stiffener pockets formed along the outer member for receiving respective ones of the stiffener poles; and means for compressingly loading at least some of the stiffener poles by the outer member for forming a desired aerodynamic shape of the bag means. Preferably at least some of the stiffener poles are collapsible for facilitating compact storage and transport thereof.

In another aspect of the invention, the apparatus includes a spaced pair of the belt members for connection to a tandem articulated pair of vehicle components, such as tandem trailers of the rig. In this aspect, the belt members are connected by a flexible bag member that aerodynamically bridges a gap between the trailers. Preferably, the bag member is formed of an elastic material for permitting stretching of an outside bag member portion that bridges a more separated portion of the gap when the trailers are angled. Also, the bag member can have an accordion-shaped configuration that is produced at an inside bag member portion that bridges a more closely spaced portion of the bag member, opposite the outside bag member portions.

DRAWINGS

These and other features, aspects, and advantages of the present invention will become better understood with reference to the following description, appended claims, and accompanying drawings where:

FIG. 1 is a front oblique perspective view of the vehicle streamline apparatus according to the present invention;

FIG. 2 is a left side elevational view of the apparatus of FIG. 1 installed on a long-haul freight vehicle;

FIG. 2a is a left side elevational view showing the apparatus of FIG. 1 installed on opposite ends of a trailer of the vehicle;

FIG. 3 is a fragmentary sectional detail view of the apparatus of FIG. 1 on line 3—3 of FIG. 3;

FIG. 4 is a plan view of the apparatus and vehicle of FIG. 2;

FIG. 5 is a fragmentary sectional perspective detail view of an upper front corner portion of the apparatus of FIG. 1 within region 5 of FIG. 2;

FIG. 6 is a fragmentary sectional elevational detail of the apparatus of FIG. 1 on line 6—6 of FIG. 2;

FIG. 7 is a fragmentary sectional elevational as in FIG. 6, showing an alternative configuration of the apparatus of FIG. 1;

FIG. 8 is a fragmentary sectional elevational view as in FIG. 6, showing another alternative configuration of the apparatus of FIG. 1;

FIG. 9 is a fragmentary sectional plan detail view of the apparatus of FIG. 1 on line 9—9 of FIG. 2;

FIG. 10 is a fragmentary sectional oblique perspective view within region 10 of FIG. 2;

FIG. 12 is a fragmentary sectional detail view of the apparatus of FIG. 11 within region 12 of FIG. 11.

FIG. 14 is a fragmentary plan diagrammatic view showing a first test shape configuration of the apparatus of FIG. 1;

FIG. 15 is a fragmentary side elevational view of the test shape configuration of FIG. 14;

FIG. 16 is a fragmentary diagram view showing both plan and elevational profiles of an alternative configuration of the shape of FIG. 14;

FIG. 17 is a fragmentary plan diagrammatic view of another shape test configuration of the apparatus of FIG. 1;

FIG. 18 is a fragmentary side elevational diagram of the configuration of FIG. 17;

FIG. 19 is a side elevational diagram as in FIG. 18 showing an alternative configuration of the shape of FIG. 17.

FIG. 20 is a side elevational diagram as in FIG. 18, showing another configuration of the shape of FIG. 17;

FIG. 21 is a side elevational diagram as in FIG. 18, showing another configuration of the shape of FIG. 17;

FIG. 22 is a fragmentary plan diagrammatic view of another shape test configuration of the apparatus of FIG. 1; and FIG. 23 is a fragmentary side elevational diagram of the configuration of FIG. 17.

DESCRIPTION

Figure 11:
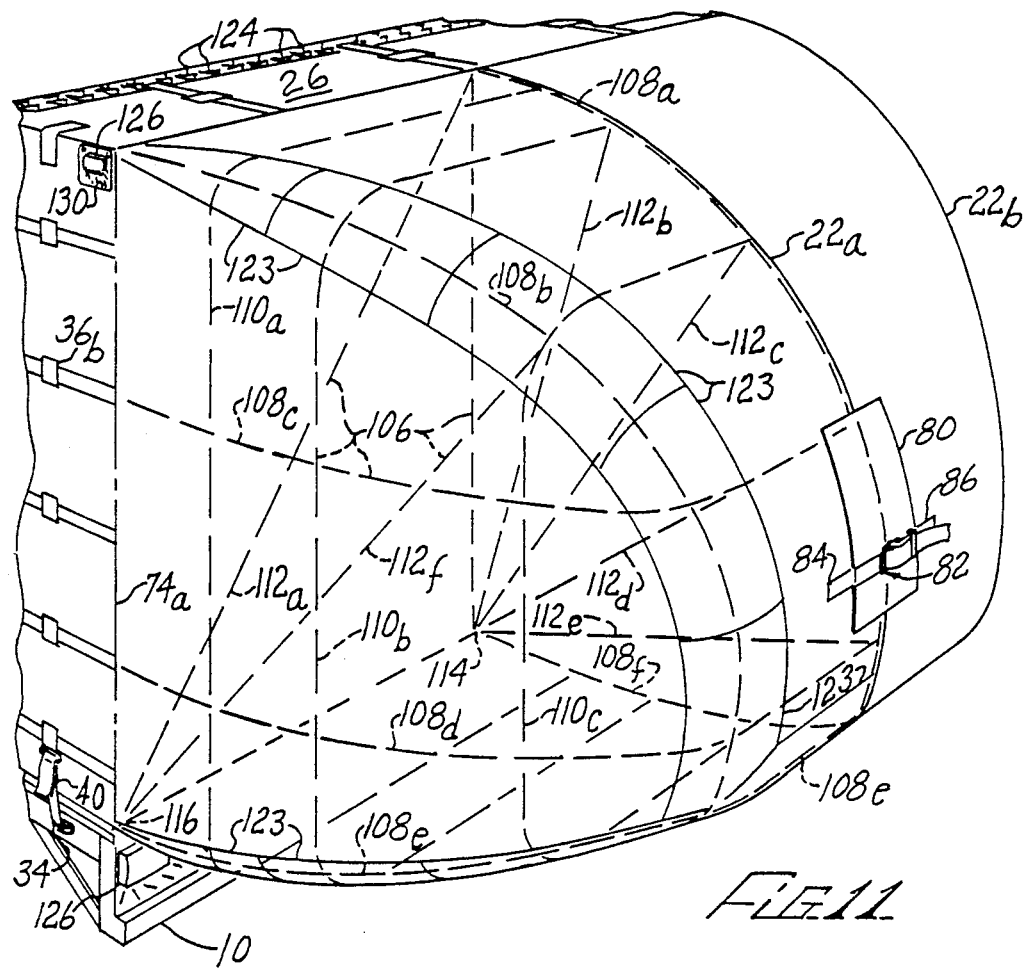
FIG. 11 is a rear oblique elevational perspective view showing an alternative configuration of the apparatus of FIG. 1.

The present invention is directed to aerodynamic drag-reducing apparatus for use in long-haul vehicles such as trailer trucks, piggyback trains, recreational vehicles, vans, and the like. With reference to FIGS. 1-6 of the drawings, a truck vehicle or trailer 10 having a longitudinal travel axis 11 is equipped with removable, preferably inflatable streamline bag apparatus 20 according to the present invention, at one end of the trailer 10. As shown in FIG. 2a, the trailer 10 can be connected behind a tractor 12, counterparts of the bag apparatus 20 preferably being installed at opposite ends of the trailer 10, and designated front bag apparatus 20a and rear bag apparatus 20b. Each bag apparatus 20 includes a bag member 22 having a desired aerodynamic shape as described below, the bag member 22 being mounted against a face surface 24 of the trailer 10 by a belt member 26 to which the bag member 22 is connected, the belt member 26 being tensioned about a perimeter surface 28 that orthogonally intersects the face surface 24 along a major portion of a perimeter extremity 30 of the face surface 24. Typically, the face surface 24 is nominally rectangular, having a width W and a depth D, the perimeter surface 28 extending to proximate opposite lower side frames 32 that typically strengthen the trailer 10. Each end of the belt member 26 has a pair of hook members 34 connected thereto, each pair of the hook members 34 engaging a corresponding side frame 32.

The belt member 26 is reinforced and tensioned by a pair of strap members, designated front strap member 36a and rear strap member 36b, the front strap member 36a extending proximate a front margin 38 of the belt member, one of the hook members 34 being connected to each end of the strap member 36a by means of an over-center lever mechanism 40 for tensioning the strap member 36a at high mechanical advantage subsequent to engagement of the hook members 34 with appropriate structure of the vehicle as best shown in FIG. 6, wherein the hook member 34 engages a structural member 41 that is formed in the side frame 32 of the trailer 10. The other hook members 34, engaging counterparts of the member 41 on opposite sides of the trailer 10, are similarly connected to the rear strap member 36b by additional ones of the lever mechanism 40. As further shown in FIG. 6, the over-center mechanism 40 is connected to the strap member 36 by a strap buckle 42 that securely grips the strap member 36 at selectable locations thereon upon application of tension by the over-center lever mechanism 40. Thus, when the apparatus 20 is installed on the trailer 10, one or both of the strap buckles 42 are adjusted for initially tensioning the associated strap member 36 with at least one of the lever mechanisms 40 open, then a high degree of tensioning is applied when both of the lever mechanisms 40 are closed.

The hook members 34 can be integrally formed as rigid members as shown in FIG. 6. With further reference to FIG. 7, an alternative configuration of the hook member 34 is fabricated as an adjustable hook assembly 44, including a threaded rod member 46 that is pivotally connected to the lever mechanism 40, the rod member 46 slidably protruding a web portion 48 of a channel member 50. The web portion 48 rigidly connects a pair of upstanding flange portions of the channel member 50, designated hook flange portion 52 and rod flange portion 54, the rod flange portion 54 supportively contacting the rod member 46 for maintaining the web portion 48 orthogonally disposed relative to the rod member 46 when tension is applied to the hook assembly 44. A wing nut 56 that is threaded onto the rod member adjustably supports the channel member 50 thereon. Adjustment by the wing nut 56 is typically effected when the lever mechanism 40 is in its released position, the lever mechanism 40 subsequently being latched for tensioning the strap member 36 at high mechanical advantage as described above. As shown in FIG. 7, the channel member 50 is located for engaging a bottom extremity of the side frame 32, rather than the structural element 41 thereof depicted in FIG. 6. It will be understood that the hook members 34 of FIG. 6 or the hook assemblies 44 of FIG. 7 can be engaged with any available structure of the trailer 10. Moreover, the channel member 50 can be elongated for receiving the rod member 46 associated with each of the front strap member 36a and the rear strap member 36b. Similarly, the rod member 46 of the hook assembly 44 can have an inverted U-shape, each leg of the rod member 46 separately protruding the channel member 50 of that hook assembly 44.

With further reference to FIG. 8, the belt member 26 can be tensioned without requiring the hook members 34 to be engaged with particular structure of the trailer 10, in that the hook members 34 that are connected to opposite ends of one of the strap members 36 can themselves be hooked together, a portion of the trailer 10 being completely enclosed by series-connected segments of the strap member 36, the lever mechanisms 40, the buckles 42, and the hook members 34.

As best shown in FIGS. 1-5, the strap member 36 engages a plurality of loop passages 58 that are formed at spaced intervals along the belt member 26, the strap member 36 being located on opposite sides of the belt member 26 between successive pairs of the loop passages 58. Thus the strap member 36 slidably engages the belt member 26 such that final tensioning of the strap member 36 can be conveniently effected by adjustment of only one of the strap buckles 42 prior to closing of the associate over-center mechanism 40. As best shown in FIGS. 4 and 5, a pair of angle members 60 is fastened to the belt member for reinforcing the belt member 26 and for registration of the belt member 26 at opposite sides of a top portion of the perimeter extremity 30 of the trailer 10. Importantly, each of the angle members 60 also distributes loading from the strap members 26 along the trailer 10 for preventing local deformation thereof. Preferably, the angle members 60 are each formed by pivotally connected plate members 62 for facilitating compact storage and transport of the apparatus 20 when not in use.

As shown in the drawings, the strap members 36 are maintained in parallel spaced relation about the perimeter surface 28 by the loop passages 58 being formed in equally spaced rows on the belt member 26 for spacing the strap members 36 by a longitudinal distance A, the rear strap member 36b also being spaced by a distance B ahead of the face surface 24. Further, the belt member 26 is stiffened longitudinally between pairs of the loop passages 58 by a plurality of batten members 64, each batten member 64 being located in a batten pocket 66 that is formed in the belt member 26. The batten pockets 66 are closed at opposite ends as indicated at 67 in FIGS. 4 and 5 for compressively loading the batten members 64 against forces that might otherwise bring the strap members 36 closer together than the spacing between the rows of the loop passages 58. Accordingly, each of the strap members 36 independently tensions the belt member 26 for securely anchoring the bag member 22 against the face surface 24 of the trailer 10. Also, the belt member 26 is clamped in close proximity to the perimeter surface 28 for avoiding unwanted drag. In addition, a resilient gasket member 68 is fastened to the belt member 26 proximate the front margin 38 and facing the perimeter surface 28, for blocking the entrance of air between the belt member 26 and the perimeter surface 28. Further, the gasket member 68 is preferably formed of a soft, lossy material such as sponge rubber for damping vibrations that might be produced by air flow over the belt member 26. A suitable material for the gasket member 68 is available as foam rubber weatherstripping that is typically used for sealing vehicle doors.

The strap members 26 can be formed from conventional woven load strapping that is typically used for tying loads, such strapping being suitably flexible for threading through the strap buckles 42 and the loop passages 58, and for adjustably traversing the angle members 60. Alternatively, the strap members 26 can be formed from thin strips of sheet metal, such as stainless steel. In such metallic form, the strap members can be suitably bent at right angles over the angle members 60 while in place on the trailer 10 (when it is not required that the same apparatus 20 be used on trailers 10 having different widths). Also, the strap members 26 can be segmented, the segment ends being rigidly connected to respective plate members 62 of each angle member 60. Adjustment of the metallic strap members 26 would be effected by means such as the threaded rod members of FIG. 7, with coarse adjustment being done, if needed, by connecting the lever mechanism 40 at selected locations along the strap member 26.

As shown in FIG. 4, the trailer 10 is typically configured with one or more openable doors 70 forming at least a portion of the face surface 24. In the usual arrangement that is depicted in FIG. 4, a pair of the doors 70 are pivotally outwardly swingable about respective door axes 72 that are vertically oriented proximate opposite sides of the face surface 24. Accordingly, the bag member 22 is divided, including a left bag member 22a and a right bag member 22b, each of the bag members 22 being pivotally connected to the belt member 26 on respective bag hinge axes 74, designated left bag hinge axis 74a and right bag hinge axis 74b, each of the hinge axes 74 being located proximately coplanar with a side portion of the belt member 26. Once the doors 70 are closed, the bag members 22a and 22b can be closed against the face surface 24, being joined proximate a rear extremity of the bag member 22 by a bag buckle assembly 76 as shown in FIG. 9. The buckle assembly 76 includes releasable fastener means 78 having a first element 78a supportively connected to the left bag member 22a, and a second element 78b that is supportively connected to the right bag member 22b by a fastener panel 80. A fastener suitable for use as the fastener means 78 is available as a conventional Velcro ® fastener having releasably connectable hook and loop portions that are interchangeably usable as the first and second fastener elements 78a and 78b. As further shown in FIG. 9, the buckle assembly 76 includes a buckle strap assembly 82 having a left strap member 84 affixed to the left bag member 22a and adjustably connected to a right strap member 86 by a strap buckle 88, the right strap member 86 being affixed in turn to the right bag member 22a. As shown in FIG. 4, the bag members 22a and 22b each extend a longitudinal distance L from the face surface 24. In practice, the distance L is approximately 5 feet for maximum aerodynamic effectiveness of the rear bag apparatus 20b within the usual administratively imposed overhand limit for non-rigid members.

With further reference to FIG. 10, each of the bag members 22, including the left bag member 22a and the right bag member 22b, is made inflatable, including a valve stem assembly 90 that is sealingly mounted to an outer sheet member 92 of the bag member 22 for admitting pressurized air. Each bag member 22 is also equipped with a blow-down assembly 94 for rapidly deflating the bag member 22 when desired. A preferred configuration of the blow-down assembly 94, including means for protecting against excessive pressure within the bag member 22, and other details of means for maintaining and monitoring the inflated condition of the bag member 22, is described in U.S. Pat. No. 4,702,509 to Morris C. Elliott, Sr., which is incorporated herein by this reference. As further shown in FIG. 10, the bag member 22 includes one or more web members 96 for holding the sheet member 92 inflated in the desired aerodynamic shape. For example, a lower rear web member 96a is connected at opposite edge extremities 98 along the inside of the sheet member 92 for defining respective tangent points of a rear radius $r_r$ in the elevational shape of the bag apparatus 20 shown in FIG. 2. Other web members 96b and 96c are similarly connected to the inside of the sheet member 92, the web member 96b defining tangent points of the side radius $r_s$ that is shown in FIG. 4, the web member 96c defining tangent points for the bottom radius $r_b$ that is shown in FIG. 3. Respective apex portions 100, designated 100a, 100b, and 100c in FIG. 10 are connected along corresponding edge portions 102a, 102b, and 102c of an anchor web member 104 that is also connected to the inside of the sheet member 92. As shown in FIG. 10, the edge portions 102b and 102c of the anchor web member 104 are marginal edges, the edge portion 102a being formed at a fold that extends across a portion of the anchor web member 104.

With further reference to FIGS. 11 and 12, an alternative configuration of the bag apparatus 20 incorporates a plurality of rod members 106 for stiffening the bag member 22, the bag member 22 being collapsible upon removal and/or disconnection of selected ones of the rod members 106. The rod members 106, which are depicted by heavy dashed lines in FIG. 11, include a plurality of longitudinal rod members, designated rod members 108a, 108b, 108c, 108d, 108e, and 108f, the rod members 108a and 108f primarily contributing to the elevational aerodynamic shape as depicted in FIG. 2, the rod members 108c and 108d primarily contributing to a plan aerodynamic shape of the bag apparatus 20 as depicted in FIG. 4, the rod members 108b and 108e primarily locating a transition shape region between the plan profile of FIG. 4 and an elevational shape profile as depicted in FIG. 2. As further shown in FIG. 11, the bag apparatus 20 can include one or more lateral rod members 110, such rod members being designated in FIG. 11 as rod member 110a, 110b, and 110c. Preferably the longitudinal rod members 108 are located in close proximity to the sheet member 92 throughout their length, the lateral rod members 110 intersecting the longitudinal rod members 108 by passing inside of the longitudinal rod members 108, opposite the sheet member 92. Thus the sheet member 92 is less subject to the formation of convex discontinuities at the longitudinal rod members 108 than may be formed along the longitudinal rod members 108. Thus the attached flow of air proximate the longitudinal rod members 108 is promoted. Additional ones of the rod members 106, designated interior rod member 112a, 112b, 112c, 112d, 112e, and 112f in FIG. 11 further contribute to the dimensional integrity of the bag member 22, while not directly affecting the external aerodynamic shape of the bag apparatus 20. For example, the rod member 112a extends diagonally proximate the face surface 24 for holding an upper extremity of the left bag member 22a proximately flush with that portion of the belt member 26 that extends across the top of the trailer 10. The interior rod members 112b through 112e each extend from proximate a lower inside extremity 114 of the bag member 22a to spaced apart locations proximate the longitudinal rod member 108a for support thereof. The rod member 112e similarly extends from proximate a lower outside extremity 116 of the bag member 22a to proximate an intermediate location along the longitudinal rod members 108b.

As shown in FIG. 12, each of the rod members 106 is located by an associated rod passage 118 that is formed within the bag member 22. At least some of the rod passages 118 are openable at at least one end thereof and having a reinforced flap member 120 that supportively, confines an end portion of the rod member 106 in a compressingly loaded state, the flap member 120 being releasably secured by a flap fastener 122 that is made from Velcro ® or similarly suitable material.

Preferably, the bag member 22 incorporates a plurality of stiffener panels 123 that are disposed along at least some of the longitudinal rod members 108b and 108e that locate the shape region, for smoothly forming the convex side radius $r_s$ and the bottom radius $r_b$. Additional counterparts of the stiffener panels 123 are preferably located also along a rear portion of the rod members 108e for smoothly forming the rear radius $r_r$.

When it is desired to collapse the bag member 22, some of the rod members 106, which are preferably also collapsible as disclosed in U.S. Pat. No. 3,834,410 to Leibel (incorporated herein by this reference), are removed from the associated rod passages 118. For example, when the longitudinal rod members 108 are so removed from the left bag member 22a, the bag member 22a may be conveniently collapsed against the face surface 24, where it may be securely bundled by straps (not shown) or other suitable means. In its bundled condition, the bag member 22a can be folded about the left bag hinge axis 74a flat against the perimeter surface 28, together with the associated door 70, thereby permitting loading operations in confined spaces.

An important feature of the present invention is the application of vortex generators 124 to the bag apparatus 20. Vortex generators are known as advantageously promoting attached air flow over a flow-control surface, and are described more fully in U.S. Pat. No. 4,455,045 to Wheeler, which is incorporated herein by this reference. Preferably, and as shown in FIGS. 1, 2, 4, 5, and 11, the vortex generators 124 are applied along the belt member 26 proximate the front margin 38 of the belt member 26. This position of the vortex generators 124 advantageously initiates vortex generation ahead of the face surface 24 for promoting attached air flow over the bag member 22. It has been determined that although vortex generators 124 may be advantageously employed directly on the bag member 22 of the rear bag apparatus 20b, a more complete realization of attached air flow is obtained by the arrangement described herein wherein the vortex generators 124 are located in a continuous or nearly continuous array along the front margin 38 ahead of the face surface 24 that would otherwise be obtained with the vortex generators located anywhere along the bag member 22 itself. Vortex generators suitable for use as the generators 124 are available as 23 inch by 4.75 inch panels of arrowhead-shaped vortex generators for automobile and aircraft applications, the panels having adhesive-backed, vacuum-formed PVC sheets forming two overlapping rows of 11 generators per row, available from Vortex Products of Sumner, Wash. As shown in FIG. 4, the front margin 38 is located a distance l ahead of the face surface 24, the distance l being approximately 2 feet. For proper location of the vortex generators 124, when the vortex generators 124 are so located proximate the front margin 38, it is believed that the distance l should be between approximately 1.5 feet and approximately 3 feet. When the distance l is the preferred approximately 2 feet, the strap members 36 can be located at the desired spacing A and distance B from the face surface 24. It is believed that a particularly advantageous spacing of the strap members 36 is obtained when the distance A is approximately 12 inches. At this spacing, and with the distance l approximately 2 feet, the distance B can be approximately 10 inches when the front strap member 36a is located proximate the front margin 38 as discussed above. Thus the belt member 26, which advantageously provides convenient means for mounting the bag apparatus 20 to the trailer 10 without modifications to the trailer 10, also provides a convenient and preferred location for the vortex generators 124 ahead of the face surface 24, also without modifications being required to the trailer 10. As shown in FIG. 2a, counterparts of the vortex generators 124 are affixed to the front bag apparatus 20a on its bag member 22, preferably along a line of high-velocity flow, ahead of the face surface 24, designated 24a in FIG. 2a.

As further shown in FIG. 5, the trailer 10 typically has a plurality of running lights 126 that are located proximate the perimeter extremity 30 of the face surface 24, the light 126 shown in FIG. 5 being located on the perimeter surface 28 and just behind the angle member 60. As shown in FIG. 5, the belt member 26, which may be made from an opaque material, has a light opening 128 formed therein for exposing the running light 126, the light opening 128 being covered with a light cover 130 that is made from a flexible, transparent material and fastened along an edge extremity thereof to the belt member 26 proximate the light opening 128. The light cover 130 thus provides a smooth, aerodynamically shaped covering for the running light 126, while also permitting the running light 126 to be clearly seen by observers of the trailer 10.

Figure 13:
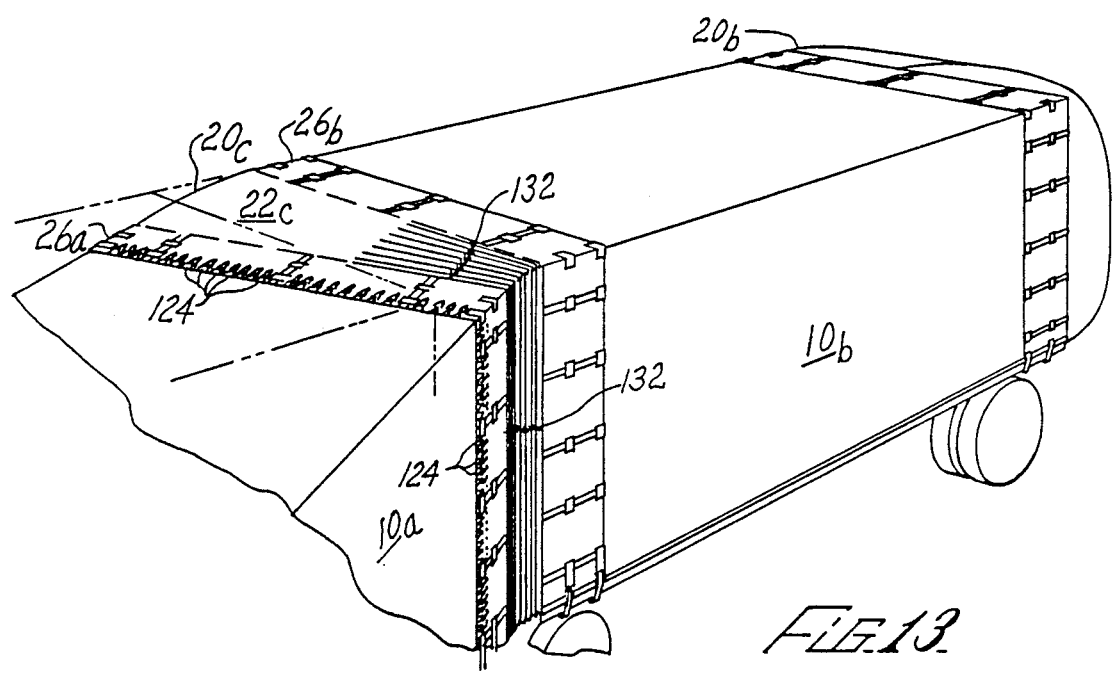
FIG. 13 is a perspective view showing an alternative configuration of the apparatus of FIG. 1 in use connecting articulated sections of the vehicle.

With further reference to FIG. 13, an important application for the present invention is in streamlining a gap that is typically present between articulated components of a vehicle rig. As shown in FIG. 13, an articulate tandem pair of the trailers, designated front trailer 10a and rear trailer 10b, is connected in a conventional manner. According to the present invention, a center bag apparatus 20c has a spaced pair of the belt members 26, designated front belt member 26a and rear belt member 26b. The belt members 26a and 26b are connected to adjacent perimeter surfaces 28 of the respective trailers 10a and 10b by the strap members 36, the hook members 34 and associated hardware as described above. A center bag member 22c that connects the belt members 26 provides a smooth aerodynamic transition between the trailers 10 as described herein. A preferred configuration of the center bag member 22c is formed from a thin, flexible, elastic material. In a relaxed position the material of the center bag member 22c is pleated with a plurality of pleat members 132. As tension is applied to the material in a direction perpendicular to the pleat members 132, the material assumes a smooth, proximately flat configuration. As further tension is applied to the material, substantial stretching occurs by virtue of the elastic nature of the material of the center bag member 22c.

The center bag apparatus 20c is preferably installed onto the trailers 10a and 10b by first draping the apparatus 20c over the top and down the sides of the trailers 10a and 10b while the trailers 10a and 10b are uncoupled, being spaced apart more closely than in the coupled condition. Once the belt members 26 are appropriately tensioned and anchored to the respective trailers 10a and 10b as described above, the trailers 10a and 10b are moved slightly apart and coupled together, thereby stretching the pleating out of the center bag member 22c (when the travel axes 11 of the respective trailers 10a and 10b are proximately aligned). The smooth condition of the center bag member 22c persists under slight relative movement between the trailers 10a and 10b such as is consistent with normal high speed travel. However, during gross movements between the trailers 10a and 10b such as during parking and the like, the material of the center bag member 22c returns to its pleated condition on the more closely spaced side of the center bag member 22c as shown in FIG. 13. Under these conditions, the pleat members 132 extend vertically over the full height of the inside portion of the center bag member 22c, and horizontally part way from the inside toward a central portion of the center bag member 22c between the tops of the trailers 10a and 10b as further shown in FIG. 13.

In further accordance with the present invention, counterparts of the vortex members 124 are preferably disposed in a continuous or semi continuous array along the front margin 38 of the front belt member 26a as also shown in FIG. 13. The vortex generators 124 on the center bag apparatus 20c advantageously promote attached air flow over the center bag apparatus 20c and the full length of the rear trailer 10b ahead of the rear bag apparatus 20b, at which location the previously described array of vortex generators 124 is operational.

With further reference to FIGS. 14–23, the aerodynamic effectiveness of several shapes for the rear bag apparatus 20b were subjected to aerodynamic testing as described herein. The various shapes were tested in successive groups, with the results of earlier tests being applied in the generation of subsequent shapes that were believed to improve upon the aerodynamic performance of the earlier shapes. Initially proposed were shapes having a generally cone-shape configuration extending to an apex behind the face surface 24, the portion closest to the face surface 24 having a convex shape generally tangent to the perimeter surface 28. Initial testing was done with full scale models that were transported on top of a vehicle at approximately 55 MPH. Subsequent tests, including tests of more promising shapes, were done on 1/12 scale models in the wind tunnel of an independent research laboratory. Each tested configuration was sequentially numbered, the results for configuration numbers 18, 19, 25–28, and 30 being discussed herein. With reference to FIGS. 14 and 15, the shape configurations were tested at the rear of a 1/12 scale model truck, a rear portion thereof being shown in the drawings, the face surface 24 having a width W of 5 inches and a depth D, also 5 inches. The length L, although varied during the testing, was 5.0 inches of the configurations of FIGS. 14–23. Similarly, the top radius $R_t$, although varied in initial tests, was uniformly 5.0 inches for the configurations of FIGS. 14–23. Other dimensions for the tested configurations of FIGS. 14–23 are tabulated in Table I, including the bottom radius $R_b$, a rear extension $e_s$ of the side radius $R_s$ behind the face surface 24, a trunk width w of a rear extremity, a rear extension $e_t$ of the top radius $R_t$, a rear extension $e_b$ of the bottom radius $R_b$, and a trunk depth d of the rear extremity, a side corner radius $r_s$, and the rear corner radius $r_r$.

TABLE I

Test Configurations

| Add-on Device (Configuration Number) | Bottom Radius $R_B$ (in.) | Rear Exten. $e_s$ (in.) | Trunk Width w (in.) | Rear Exten. $e_t$ (in.) | Rear exten. $e_b$ (in.) | Trunk Depth d (in.) | Side Corner Radius $r_s$ (in.) | Rear Corner Radius $r_r$ (in.) |
|---|---|---|---|---|---|---|---|---|
| 18 | 5.00 | 2.50 | 5.00 | 2.50 | 2.50 | 5.00 | 0.00 | 0.00 |
| 19 | 5.00 | 2.50 | 3.50 | 2.50 | 2.50 | 3.50 | 0.00 | 0.00 |
| 25 | 5.00 | 3.00 | 3.50 | 3.00 | 2.50 | 3.50 | 0.00 | 0.00 |
| 26 | 5.00 | 3.00 | 3.50 | 4.00 | 2.50 | 3.50 | 0.00 | 0.00 |
| 27 | ∞ | 3.00 | 3.50 | 5.00 | 4.25 | 0.00 | 0.00 | 0.00 |
| 28 | ∞ | 3.00 | 3.50 | 5.00 | 5.00 | 3.00 | 0.00 | 0.00 |
| 30 | 8.00 | 2.50 | 3.50 | 5.00 | 4.75 | 0.00 | 1.00 | 0.50 |

The results of the wind tunnel tests on the configurations of FIGS. 14–23 are presented in table II. The semi-trailer model was first tested without a drag-reduction device or vortex generators for obtaining a base-line drag coefficient that was adjusted to an average value of 1.00. The drag coefficients for all other configurations tested were adjusted in a similar manner so that they can be compared to the base-line configuration. In the test environment, a data acquisition system sampled the output of a pair of force transducers and a velocity transducer, the sampling being repeated at least 50 times as rapidly as possible with the mean values of the force and velocity samples being output as a data set. Approximately 10 such data sets were taken at time intervals of approximately 7 seconds. The mean of the force and velocity outputs of these data sets were then used to obtain one of the drag coefficients. From these adjusted drag coefficients were computed mean drag coefficient values for each of the test configurations, along with the standard deviation of the mean.

TABLE II

Test Results

| Base-Line plus Add-on Device Number | Without Vortex Gen. | | | | | With Vortex Gen. | | | | |
|---|---|---|---|---|---|---|---|---|---|---|
| | Adj. Drag Coefficient | | | Mean Adj. Drag | Std. Dev. from Mean | Adj. Drag Coefficient | | | Mean Adj. Drag | Std. Dev. from Mean |
| Base-Line with no Add-on | 1.00 | 1.05 | 0.97 | 1.00 | 0.009 | | | | | |
| | 1.04 | 1.04 | 0.99 | | | | | | | |
| | 1.01 | 1.03 | 1.01 | | | | | | | |
| | 1.01 | 1.00 | 0.96 | | | | | | | |
| | 0.96 | 0.96 | | | | | | | | |
| 18 | 0.91 | 0.91 | 0.91 | 0.91 | 0.001 | 0.88 | 0.92* | 0.89 | 0.88 | 0.004 |
| | | | | | | 0.89 | 0.87 | 0.89 | | |
| | | | | | | 0.88 | 0.87 | 0.89 | | |
| 19 | 0.88 | 0.87 | 0.87 | 0.87 | 0.002 | 0.87 | 0.87 | 0.89 | 0.86 | 0.008 |
| | | | | | | 0.86 | 0.87 | 0.88 | | |
| | | | | | | 0.84 | 0.82 | 0.84 | | |
| 25 | 0.90 | 0.92 | 0.88 | 0.89 | 0.008 | 0.88 | 0.89 | 0.86 | 0.86 | 0.005 |
| | 0.87 | 0.90 | 0.93 | | | 0.84 | 0.85 | 0.86 | | |
| | 0.86 | 0.86 | 0.88 | | | 0.87 | 0.87 | 0.85 | | |
| 26 | 0.90 | 0.91 | 0.92 | 0.91 | 0.005 | 0.83 | 0.84 | 0.83 | 0.84 | 0.004 |
| | 0.92 | 0.90 | 0.89 | | | 0.86 | 0.82 | 0.83 | | |
| | 0.93 | 0.95* | 0.90 | | | 0.84 | 0.84 | 0.87 | | |
| 27 | 0.86 | 0.86 | 0.87 | 0.86 | 0.003 | 0.84 | 0.85 | 0.85 | 0.85 | 0.003 |
| | 0.86 | 0.87 | 0.85 | | | 0.86 | 0.85 | 0.85 | | |
| | 0.87 | 0.87 | | | | 0.87 | 0.84 | | | |
| 28 | 0.89 | 0.88 | 0.89 | 0.90 | 0.006 | 0.88 | 0.89 | 0.91* | 0.89 | 0.002 |
| | 0.92 | 0.92 | 0.90 | | | 0.88 | 0.89 | 0.90 | | |
| | | | | | | 0.88 | 0.88 | 0.88 | | |

TABLE II-continued

| Base-Line plus Add-on Device Number | Test Results | | | | | |
|---|---|---|---|---|---|---|
| | Without Vortex Gen. | | | With Vortex Gen. | | |
| | Adj. Drag Coefficient | Mean Adj. Drag | Std. Dev. from Mean | Adj. Drag Coefficient | Mean Adj. Drag | Std. Dev. from Mean |
| 30 | | | | | | |

*Data rejected by Chauvenet's Criterion

From the results of the tests, it is clear that configuration 27, without vortex generators, provides a 14 percent reduction in drag as compared with the base-line configuration. This is a significant improvement that would result in substantial fuel savings in long-haul operations. When vortex generators were added to the test configurations, configuration 27 yielded a 15 percent reduction in drag below base-line, yet configuration 26 provided a 16 percent reduction. It is believed that configuration 30 will provide a further improvement over the most effective shapes previously tested (configuration 27, without the vortex generators; configuration 26 with the vortex generators). The test results are not yet available for configuration 30, which is currently under test. It is expected that yet further improvements would be realized when the trailer 10 is equipped with both the front bag apparatus 20a and the rear apparatus 20b.

Although the present invention has been described in considerable detail with reference to certain preferred versions thereof, other versions are possible. For example, the strap members 36 can be integrally formed with the belt member 26. Also, the bag member 22 of the configuration of FIGS. 11 and 12 can be made at least partially inflatable for smoothing discontinuities that might otherwise be formed along the rod members 106.

Also, the front belt member 26a of the middle bag apparatus 20c can carry a pair of vertically oriented rollers, and the bag member can be a planar sheet, opposite ends thereof being connected to opposite side portions of the rear belt ember 26b, the sheet being fed crosswise in front of the rollers during articulation of the trailers 10a and 10b. A flap member connected to a top portion of the front belt member 26a can extend over the rear belt member 26b, being slidingly supported thereby. Further, the bag member 22 and/or the belt member 26 can be made translucent or transparent for direct view of the lights 126 therethrough. Moreover, the apparatus 20 can be provided with additional illumination means within the bag member 22 for facilitating identification of the apparatus 20 in use, especially at night. The bag member 22 itself provides a particularly suitable vehicle for displays such as advertisements and the like. Therefore, the spirit and scope of the appended claims should not necessarily be limited to the description of the preferred versions contained herein.

What is claimed is:

1. Apparatus for streamlining a vehicle body having at least one end member face area comprising a substantially plane surface perpendicular to a travel axis of the vehicle, and a perimeter surface, the perimeter surface orthogonally intersecting the face area along a major portion of a perimeter extremity of the face area, the apparatus comprising:
   (a) a belt member for covering a portion of the perimeter surface;
   (b) means for supporting the belt member in close conformity with the perimeter surface, comprising means for tensioning a tension member about a major portion of the perimeter surface;
   (c) collapsible bag means connected to the belt member by mounting for support against the face area and having a smooth aerodynamic convex portion facing away from the face area, the bag means comprising:
      (i) a flexible outer member;
      (ii) a plurality of stiffener poles;
      (iii) a plurality of elongate stiffener pockets formed along the outer member for receiving respective ones of the stiffener poles; and
      (iv) means for compressingly loading at least some of the stiffener poles by the outer member for forming a desired aerodynamic shape of the bag means.

2. The apparatus of claim 1, wherein the vehicle body includes opposite lower side frames proximate respective lower extremities of the perimeter surface, the mans for tensioning the tension member comprising:
   (a) first and second hook members for engaging respective ones of the side frames;
   (b) means for connecting the hook members to opposite ends of the tension member; and
   (c) tightening means for pulling at least one of the hook members at high mechanical advantage toward the other hook member by the tension member.

3. The apparatus of claim 2, wherein the tightening means comprises over-center lever means connected between the hook members and having a latched position and an unlatched position, the tension member being tightened in the latched position.

4. The apparatus of claim 3, wherein the tension member comprises a strap member, the strap member and the over-center lever means being connected between the hook members, the strap member engaging the belt member.

5. The apparatus of claim 4, wherein the strap member slidably engages loop means on the belt member.

6. The apparatus of claim 4, comprising first and second strap members, the first strap member being located proximate an edge margin of the belt member opposite the bag means, the second strap member being spaced between the first strap member and the bag means.

7. The apparatus of claim 6, further comprising a plurality of batten members for separating the straps by stiffening the belt member, each batten member being enclosed in a batten pocket of the belt member and oriented substantially parallel to the travel axis.

8. The apparatus of claim 7, wherein at least some of the batten pockets engage opposite ends of the respective battens for maintaining the belt member in a longitudinally extended condition.

9. The apparatus of claim 6, further comprising a resilient, elongate gasket member connected to an inside surface of the belt member proximate the edge margin for damping vibrations of the belt member, and for sealing the edge margin against the perimeter surface of the vehicle body.

10. The apparatus of claim 2, wherein the tightening means comprises threaded clamp means connected between the hook member and the belt member for threadingly advancing the hook member relative to the belt member.

11. The apparatus of claim 10, wherein the clamp means comprises a threaded rod member tixably connected to the belt member and protruding the hook member, and a nut member threadingly engaging the rod member for advancing the rod member through the hook member.

12. The apparatus of claim 11, wherein the hook member comprises a channel member having a web portion and opposite upstanding flange portions, the rod member protruding the web portion proximate one of the flange portions, wherein a flange extremity of the flange portion contacts the rod member for maintaining the web portion substantially perpendicular to the rod member.

13. The apparatus of claim 10, wherein the clamp means further comprises lever means having an open position wherein the hook member can be threadingly advanced in a loose condition for adjustment thereof, and a closed position, the belt member becoming tensioned when the lever means is moved from the open to the closed position.

14. The apparatus of claim 1, wherein the vehicle body includes at least one openable door member, an outside surface of the door member forming at least a portion of the face area, the mounting means comprising:
(a) bag hinge means for swingably supporting at least a portion of the bag means from the belt means on a bag hinge axis, the bag hinge axis being located proximately coplanar with a side portion of the belt member; and
(b) bag holding means for releasably holding the swingable portion of the bag means approximately against the face area when the door member is in its closed position.

15. The apparatus of claim 14, wherein the bag holding means comprises bag fastener means for connecting the swingable portion of the bag means to an adjacent bag means portion, the bag fastener means being located at a substantial distance from the plane of the face area and from the bag hinge axis.

16. The apparatus of claim 15, wherein the bag fastener means comprises a hook and loop fastener.

17. The apparatus of claim 16, wherein the bag fastener means further comprises an auxiliary strap for connecting between the bag means portions and across the hook and loop fastener for preventing opening of the hook and loop fastener.

18. The apparatus of claim 14, wherein the vehicle body forms a laterally disposed pair of the door members, the bag means forming a pair of openable bag halves, the bag holding means comprising fastener means for releasably connecting the bag halves.

19. The apparatus of claim 1, wherein at least some of the stiffener poles are collapsible for facilitating compact storage and transport thereof.

20. The apparatus of claim 1, wherein the means for compressively loading comprises a flap member that forms an end extremity of at least one of the stiffener pockets, the flap member having a free end that is releasably secured relative to the bag member for admitting one of the rod members into a corresponding stiffener pocket and for adjustably closing the pocket, whereby the flap member compressively loads one end of the rod member.

21. The apparats of claim 1, further comprising a plurality of stiffener panels for forming convex side and bottom radius portions of the bag member.

* * * * *